United States Patent [19]
Stephenson et al.

[11] Patent Number: 5,450,099
[45] Date of Patent: Sep. 12, 1995

[54] THERMAL LINE PRINTER WITH STAGGERED HEAD SEGMENTS AND OVERLAP COMPENSATION

[75] Inventors: Stanley W. Stephenson, Spencerport; Marcello D. Fiscella, Fairport, both of N.Y.

[73] Assignee: Eastman Kodak Company, Rochester, N.Y.

[21] Appl. No.: 43,689

[22] Filed: Apr. 8, 1993

[51] Int. Cl.⁶ ............................................. B41J 2/325
[52] U.S. Cl. .................................... 347/200; 400/82; 347/211
[58] Field of Search ................... 346/76 PH; 400/120, 400/82

[56] References Cited

U.S. PATENT DOCUMENTS

| | | | |
|---|---|---|---|
| 4,074,109 | 2/1978 | Baraff et al. | 219/216 |
| 4,675,533 | 6/1987 | Shimizu | 250/578 |
| 4,698,643 | 10/1987 | Nishiguchi et al. | 346/76 PH |
| 4,745,413 | 5/1988 | Brownstein et al. | 346/76 PH |
| 4,899,170 | 2/1990 | Izumi | 346/76 PH |

FOREIGN PATENT DOCUMENTS

0423797   4/1991   European Pat. Off. .

*Primary Examiner*—Huan H. Tran
*Attorney, Agent, or Firm*—Milton S. Sales

[57] ABSTRACT

A method of and apparatus for sequentially printing lines of image pixels in the thermal printing of a two-dimensional image on a wide receiver media employing a print head arrangement of the type comprising a plurality N of linear thermal print head segments each comprising a set n of thermal print elements, each element having a data bit input terminal, in an alternating, staggered pattern in first and second rows of $N_1$ and $N_2$ print head segments arranged across the media in a print line direction such that respective sub-sets of $n_1$ thermal print elements of the adjacent ends of the $N_1$ and $N_2$ print head segments arranged in the first and second rows overlap in the print line direction. Each line of image print data into first and second print line data sub-sets which, when applied to the respective first and second rows of print head segments, print respective first and second line sub-images each having a complete segment and a partially complete segment, wherein the partially complete segments positionally overlap one another. The partially complete segments of the first and second line sub-images have their complete areas distributed throughout the respective segment in complementary patterns, which may reflect an arbitrary or random distribution.

21 Claims, 8 Drawing Sheets

CONVENTIONAL TILED HEAD OVERLAP

FIG. 6A

INTERLEAVED TILED HEAD OVERLAP

FIG. 6B

THERMAL LINE PRINTER WITH STAGGERED HEAD SEGMENTS AND OVERLAP COMPENSATION

BACKGROUND OF THE INVENTION

1. Field of the Invention

The present invention relates to a thermal line printer of the type having a divided line head composed of a plurality of linear thermal head segments or "tiles" aligned in the width direction of a recording medium sheet perpendicular to the feeding direction or the lengthwise direction of the recording medium sheet so that a predetermined number of thermal print elements of adjacent tiles overlap so as to cover the entire span or width of the recording medium sheet, and particularly to a system for distributing print data bits among the overlapping print elements.

2. Description of the Prior Art

Typical thermal line print heads are constructed with a linear array of thermal print elements that are individually heated by data encoded energization signals to effect by sublimation the transfer of a dye donor onto the pixel or dot area line by line onto a moving a receiver sheet to form a two-dimensional image thereon. Such printers are described, for example, in commonly assigned U.S. Pat. Nos. 4,745,413 to Brownstein et al. and 4,710,783 to Caine et al., both of which are incorporated herein by reference. In such printers, the linear array segments are typically constructed to extend about 12 inches in width and are capable of printing lines of image pixels across typical 11 inch (or less) printing paper. The dye-donor film patches are similarly dimensioned so that it is not possible to print color images of a single image frame exceeding the widths of the linear array and the dye donor patch. The dye donor patch is also limited in length.

In order to overcome the length limitation of the dye donor patches, commonly assigned U.S. Pat. Nos. 5,132,701 and 5,140,341 to Stephenson and Fiscella, both incorporated herein by reference, describe a system and method for successively printing each of the three, single color separation, two-dimensional images in superimposition on a receiver to form a complete multi-color image having a length exceeding the comparable length of the dye-donor patches. In the '701 and '341 patents, two (or more) dye donor patches of the same color are employed in the printing of each of the color separation images in an image region on the receiver sheet. The data set for the entire, two-dimensional, color separation image is divided into first and second sub-image data sets for respective first and second sub-images in the length dimension, wherein the sub-images overlap one another in an overlap region comprising a certain number of print lines. The corresponding overlap line print data is distributed in a complementary manner in the first and second sub-image data sets with a blank print data bit pattern to mask any straight line effect at the boundary of the two sub-images that might otherwise appear on the receiver.

The sub-image data sets are successively applied to the thermal print head elements during the advancement of the receiver and the two, same color, dye donor patches past the print head array. The print head responds by successively printing the two sub-images in a merged fashion in the overlap region. Thus, it is possible using these techniques to print elongated image formats as long as the image format does not exceed the nominal 12 inch width of the single thermal head array.

However, it remains desirable to make larger prints despite the costs inherent in the gravure printing of dye-donor patches exceeding the nominal 12 inch width dimension. In order to print images which exceed the nominal 12 inch width in both dimensions, it has been proposed to construct a composite print head that is composed of a plurality of linear thermal print head segments or tiles, each consisting of a nominal 12 inch array of thermal print elements, aligned end to end in a single row and coupled to a source of data bits for selectively energizing the print elements in order to print images on large size recording paper such as A1 size and A0 size. Such an arrangement of series-connected, linear print head segments is more economic to manufacture, given the poor manufacturing yield rate of corresponding monolithic thermal print heads of comparative length.

However, this type of conventional elongated, multi-segment, thermal print head suffers the drawback that the pitch of the individual heating elements is irregular along the junction or connecting portion of adjacent thermal print head segments and thereby causes lines of higher (if too close together) or lower (if too far apart) density to appear at the juncture of each print head segment and thus impairs the quality of the printed image pattern.

The prior art discloses several methods for creating such elongated, multi-segment, thermal print heads. One technique is to fabricate the linear print head segments with the thermal elements disposed up to the edge of each segment. These segments are then bonded end to end onto a carrier plate so that the edge elements are in close proximity, and the segments form a single, linear array of thermal elements. When these heads are manufactured, there may be a discontinuity and minor misalignment between the edge elements that results in a line or streak at the transition elements during printing. These heads are useful in applications which require only black or white marking, or in applications which do not require high quality. The density discontinuity is more noticeable in applications that require smooth, continuous tone, such as near photographic quality prints.

A further type of conventional, elongated, multi-segment, thermal print head is the "divided line" head, disclosed, for example, in U.S. Pat. Nos. 4,660,052 to Kaiya et al., 4,977,410 and 5,003,323 to Onuki et al., and 5,119,108 to Hatakeyama. The divided line thermal print head is composed of a plurality of linear thermal head segments aligned in first and second of parallel rows in staggered relation and in partially overlapping relation at end portions of each adjacent linear segment in the sheet feeding direction so as to completely cover the entire width of recording paper. In operation each line of data bits to be printed is divided between first and second line data sub-sets for the respective first and second parallel rows. The first, or upstream, row of linear thermal element segments is activated with the first line data sub-set to print a part of the single line. After the receiver is advanced the requisite distance, the second, or downstream, row of linear thermal element segments is energized with the second line data sub-set to thereby complete the single line printing.

In such operation, in order to avoid duplicate printing by the overlapping portion of the staggered segments between the first and second rows, a predetermined number of thermal printing elements in each overlapping set are blanked during the printing operation with the first and second line data sub-sets. The staggered linear print head segments must be precisely positioned relative to each other to set a predetermined overlapping dimension corresponding to the span of the predetermined number of the blanked heating elements. Again, it is practically quite difficult to precisely and equally set the overlapping dimension of the individual staggered segments between the adjacent pair of rows during assembly of the divided line head and to maintain the set overlapping dimension due to thermal expansion of the linear segments during the continuous printing operation.

The '410, '323 and '108 patents are directed to software and hardware based systems for controlling the selection of the blanked overlapping elements of the linear head segments. In these patents, the system electrically defines the end thermal print elements of the upstream and downstream alternate line segments to minimize the line memory buffer space and to compensate for the manufacturing error offset between adjacent line segments forming the two displaced lines of segments.

PROBLEM TO BE SOLVED

The difficulty of the edge discontinuity is still not solved by the divided line print head employing these thermal printing element blanking techniques. Because the head segments are staggered there will be a slight misalignment between the printing areas covered by both sets of elements. This error in placement can occur both in the direction that the elements extend and in the offset distance between adjacent segments. The error could be up to about 20 percent of the width of the elements. If the elements are 83 microns wide, the required accuracy of elements between segments would have to be less than 1 micron because the human eye is sensitive to a 1% change in density. This is not currently possible, so the resulting images tend to have a thin light or dark line down the image that corresponds to the misalignment gap or overlap between the energized elements of the overlapped segments.

SUMMARY OF THE INVENTION

In view of the above-noted drawbacks of the conventional divided line, staggered thermal print head segments, an object of the present invention is to compensate the positional error of the staggered arrangement of linear print head segments to alleviate the appearance of the lines in the printed image by randomly distributing print head element image data signals and complementary element blanking signals in complementary print line patterns among the overlapping sub-sets of print head elements.

A further object of the present invention is to effect a different distribution of the complementary image data and blanking signals among the subsets during printing of each line so that the appearance of linear print lines in the media advance direction is minimized.

In accordance with the invention, the segments are mounted so that overlapping sub-sets of print head elements provide a resulting image pixel overlap of printed image dots in each image line printed by the multiple adjacent print head segments. The two sub-sets of elements that are located in each overlapped segment area are selectively energized with first and second sub-sets of interlaced print data signals selected in a complementary pattern from the corresponding sub-set of data bits of the line of print data bits. The error in mis-alignment between overlapped sub-sets of elements of the two segments is now blended over a larger area so that the mis-alignments are less noticeable.

The present invention is directed to a method and apparatus for producing a desired complete print line image from two or more print line sub-images. The sub-images are formed so that segments of each printed line are partially complete and the partially complete segments of each print line overlap each other and form a complete printed line. Each of the partially complete segments is formed with a distributed pattern of complete and blank areas. The pattern of blank areas of one of the overlapping segments corresponds to the pattern of complete areas of the other overlapping segment so that the desired print line image appears to be continuous where the partially complete segments overlap each other.

Viewed from one aspect, the present invention is directed to a method of and apparatus for sequentially printing lines of image dots or pixels in the printing of a two-dimensional image. The apparatus operates in accordance with the steps of successively processing each line of image print data into first and second print line data sub-sets which, when used to print, print respective first and second line sub-images each having a complete segment and a partially complete segment, wherein the partially complete segments positionally overlap one another. The partially complete segment of the first line sub-image has its complete areas distributed throughout the segment in a certain pattern, which may reflect an arbitrary or random distribution. The partially complete segment of the second line sub-image has its complete areas distributed throughout the segment in a pattern that is complementary to the pattern of complete areas of the partially complete segment of the first line sub-image. The complete areas of the overlapping partially complete segments of the first and second line sub-images thus spatially fill-in the overlap each other so that the sub-images combine to produce a complete line image.

In accordance with a preferred embodiment of practicing the invention, a method and apparatus for operating a printer having a plurality of print head segments arrayed in first and second rows in the direction of the printing line, each print head segment further comprising a plurality of printing elements responsive to print line data bits applied thereto for printing image pixels in a print line on a receiver and responsive to sequentially applied print line data bit sets for printing successive image lines on the receiver, wherein the first and second rows of print head segments are positioned so that a first sub-set of a number of the printing elements of each print head segment in the first row spatially overlaps with a second sub-set of a like number of the printing elements of each adjacent print head segment in the second row, if any, thereby defining an overlap region, and wherein the receiver is moved relative to the first row and the second row of print head segments in printing each image line, preferably comprises the steps of and apparatus for: distributing the print line data bits among the plurality of print head segments so that print line data bits are distributed in a complementary blended pattern among the overlapping printing elements of said plurality of print head segments.

Preferably, the distribution of print line data bits is accomplished by: distributing a first sub-set of line image data bits to all of the print head segments in the first row as a first line sub-image with at least one complete and at least one partially complete first line sub-image segment in the overlap region, each partially complete first line sub-image segment having its image pixels distributed in a first interleave pattern in the overlap region; and distributing a second sub-set of line image data bits to all print head segments in the second row as a second line sub-image with at least one complete and at least one partially complete second line sub-image segment in the overlap region, each partially complete segment of the second line sub-image having its image pixels distributed in a second interleave pattern in the overlap region that is complementary to the first interleave pattern of image pixels, so that the first and second line sub-images combine to produce a complete line image for each set of line image data bits.

More particularly, each set of line print data bits is distributed by: counting the data bits of each print line data bit set; defining starting and ending data bit counts for each print head segment in the first and second rows, where the starting count for each such print head segment is lower than the ending count of an immediately adjacent print head segment in the overlap regions thereof; enabling the distribution of the first and second print line data bit sub-sets to the respective thermal print head segments in response to the starting and ending data bit counts for each print head segment, whereby the same print line data bits are enabled for distribution to the sub-sets of print head elements in each overlap region thereof; and selectively suppressing the distribution of the same print line data bits to corresponding print elements in the overlap regions in a distributed pattern in the first and second sub-sets of overlapping printing elements of each print head segment.

BENEFICIAL RESULTS OF THE INVENTION

The present invention thus produces a desired two-dimensional image from a succession of printed line images wherein the processing of the print line data for each successive printed line of image dots or pixels results in a differing distribution of the complementary complete areas of the partially complete segments of the first and second line sub-images for each successive printed line image. The apparatus and method operates to produce the sets of first and second line sub-images with the partially complete segments thereof having blank areas which are distributed in accordance with a pattern that does not produce a substantial linear alignment of the blank areas of each complete segment with those of the following complete segment or segments.

Moreover, in accordance with the invention, the apparatus and method also provides for blending of alignment error in the direction of printing. The segments are also offset from one another in the printing direction, and misalignment of line image dots can occur in that direction also. By using a pattern of printing that optimally distributes all the errors into the higher detectable frequencies, the down page axis errors, e.g. streaks, become less noticeable.

BRIEF DESCRIPTION OF THE DRAWINGS

These and other objects, advantages and features of the present invention will become apparent from the following detailed description of the preferred embodiments thereof as illustrated in the drawings, in which:

FIG. 5($a$–$b$) is a flow chart illustrating the method of operating the system of FIGS. 1 and 4 in accordance with the invention.

The figures are not necessarily to scale.

DETAILED DESCRIPTION OF THE PREFERRED EMBODIMENTS

Figure 1:
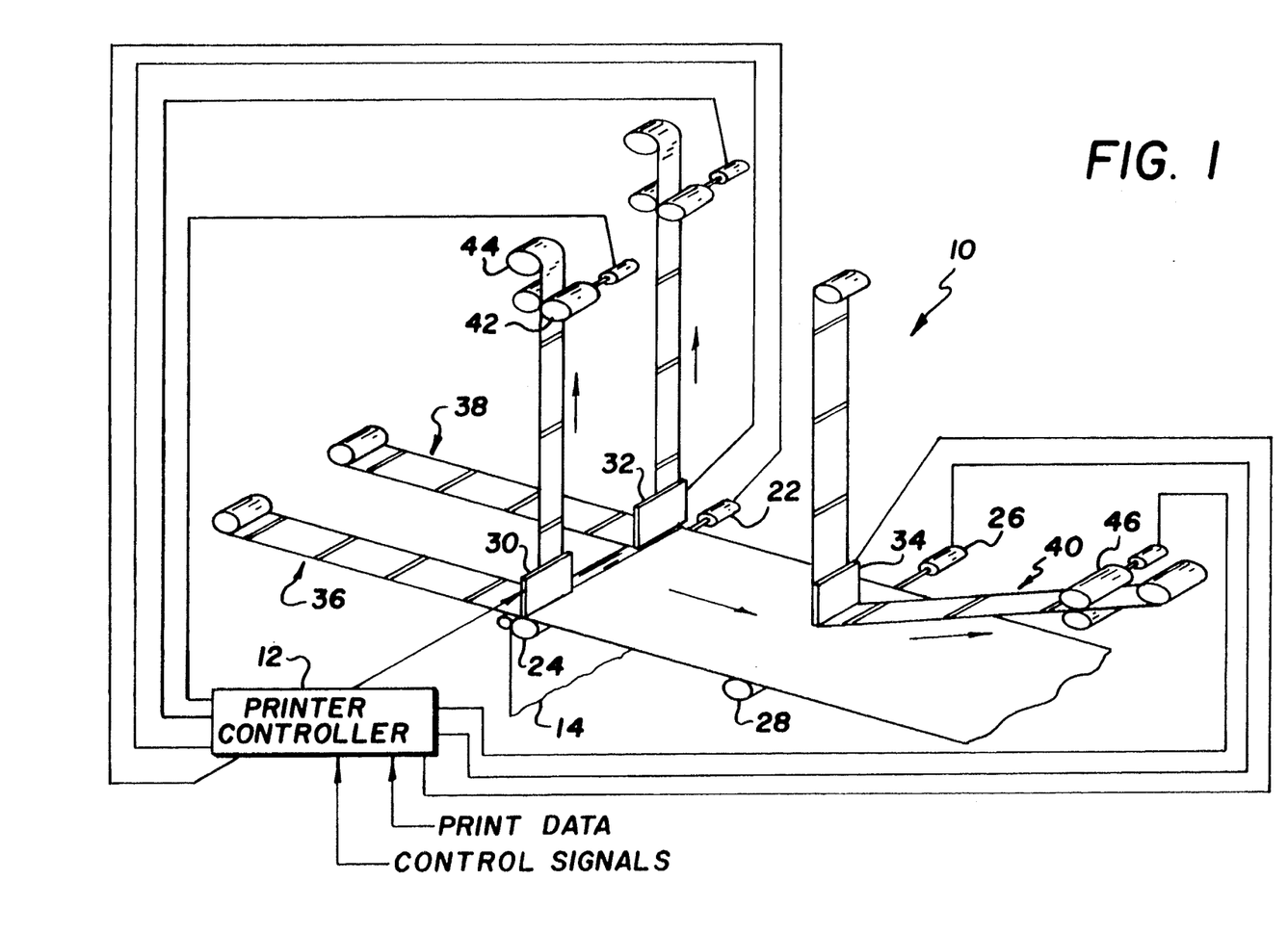
FIG. 1 is a perspective view of a divided line thermal printer assembly comprising three linear print head segments in two staggered rows extending across the width of a print receiver in relation to separate dye donor webs in which the invention may be practiced.

Turning now to FIG. 1, it depicts in a simplified perspective view the electro-mechanical components of a divided line thermal printer 10 operated by an illustrative electronic printer controller 12 in which the present invention may be practiced. The printer controller 12 is a microprocessor-based control system of the type described in the above-incorporated '413 and '783 patents. The printer controller 12 receives an image print data signals from a conventional computer image source (not shown) and generates line data bit sets in a manner to be described in reference to FIGS. 2 and 3 that are employed in printing lines of the multi-color image on a two-dimensional image frame on the receiver 14. Additionally, the printer controller 12 receives signals from the receiver and dye-donor film advancement mechanisms and detectors (not shown) in the thermal printer 10 which provide routine administrative information, such as a position of the receiver 14, position of each of the dye-donor webs 16, 18, 20, the beginning and end of a print cycle, etc. The printer controller 12 generates operating signals for all of the receiver and dye-donor web advance motors in response to such information.

The receiver 14 is advanced in the print and return directions by the receiver drive motors 22 and 26 that rotate a conventional platen and capstan drive mechanism 24 and platen 28. The three illustrated print head segments 30, 32 and 34 and three corresponding dye-donor webs 16, 18, 20, respectively, bear against the image receiving surface of receiver 14. The dye-donor webs contain successive dye donor patches, designated C, M, Y, of cyan, magenta and yellow (and, optionally, black) dye that is sublimated by heat to transfer from the respective patch and onto the image frame on the receiver 14. The printer controller 12 provides dye-donor web advance control signals to the advance motors and drive capstan and roller assemblies 42, 44 and 46.

The thermal printing elements of each print head segment 30, 32, 34 performs a printing operation by selectively heating and thereby transferring dots of cyan, magenta and yellow dye from the dye-donor patches onto the receiver 14 to form image dots or pixels. The intensity or density of each resulting image pixel is dependent on the amount of each dye color that is deposited in the dye transfer effected by the heated element in contact with the dye patch. The amount of dye color transferred is dependent on the temperature of the heated element which in turn is dependent on the line print data for that particular line, color and element. In practice, the line print data for each image pixel may be either a binary single bit value to heat at a set time and current or not heat the element or it may be a multi-bit value which may control the time or current level to achieve a grey scale or gradation in density of the print dot. In either case, in order to simplify the description, the coded data for printing each line of print is referred to herein as comprising a set of line print data bits equal in number to the total number of thermal print head elements making up the divided line print head that may be energized to print a line of image pixels. The creation of a full color image requires the deposition of the three color images in sequence and in registration on the image frame on receiver 14. This system of dye sublimation and deposition thermal printing employing three color separation dye-donor films is well known in the prior art and is described in detail in the above-incorporated '783 and '413 patents.

As described below, the double line thermal print head is constructed of a series, such as three, of linear print head segments 30, 32, 34 that each have n discrete thermal printing elements at a pitch of about 12 pixels per millimeter. Each segment is energized by a sub-set of the line print data bit set to print a line sub-image. A certain number of the n thermal printing elements in each segment overlaps in the print line direction with a like number of elements in an adjacent (in the print line direction) segment. The overlapping elements are seldom in alignment or remain in alignment with thermal expansion and contraction of the segments. In a typical multi-colored image of this resolution, the unaided human eye does not readily detect an absence or misplacement of an occasional one of the image pixels. However, the unaided human eye will detect a line or streak if a series of pixels are missing or misplaced if the misplacement has a substantially linear alignment. Thus if two sub-images are joined at a line, an overlap resulting in greater pixel density or a gap resulting in lighter pixel density between the sub-images is visible as a line or streak to the unaided eye. Such a streak is evident in the illustration of FIG. 6A described hereafter.

Consequently, it has been found desirable in our above-referenced '701 and '341 patents to merge two-dimensional sub-images of a two-dimensional image in a relatively long overlap segment whereby the image data is distributed randomly over a two-dimensional overlap segment. The visibility of the overlap segment of the two sub-images decreases with random distribution of image data and as the length of the overlap segment increases.

In accordance with the present invention, each of the line sub-images is made partially complete in segments of the image frame on the receiver 14 where the elements of the print head segments 30, 32, 34 overlap. Distribution of the line image print data into three sub-image print data sub-sets is accomplished in a manner described hereafter by a microprocessor based data distributing circuit in the printer controller 10. The line image print data sub-sets for the line sub-images are stored in conventional RAM as data fields and retrieved when the corresponding line of the image frame on receiver 14 is advanced to the first row $N_1$ of print head segments 30 and 32 and later to the second row $N_2$ containing print head segment 34.

FIG. 1 shows an exaggerated view of the arrangement of N (or three as shown) linear print head segments 30, 32, 34 making up the linear thermal print head. As described above, the N linear print head segments 30, 32 and 34 are arranged in staggered relation forming the pair of parallel rows designated $N_1$ and $N_2$. The segments 30 and 32 are disposed along the upstream (in the direction of receiver advancement) row $N_1$ and the segment 34 is disposed along the downstream row $N_2$ and between the segments 30 and 32 so that a certain number of the thermal printing elements in each segment overlap one another in the width dimension on the receiver 14 in a manner explained hereafter in reference to FIGS. 4A–4D. The parallel rows $N_1$ and $N_2$ are spaced from each other a given distance or gap D in the receiver 14 feeding direction.

Figure 2:
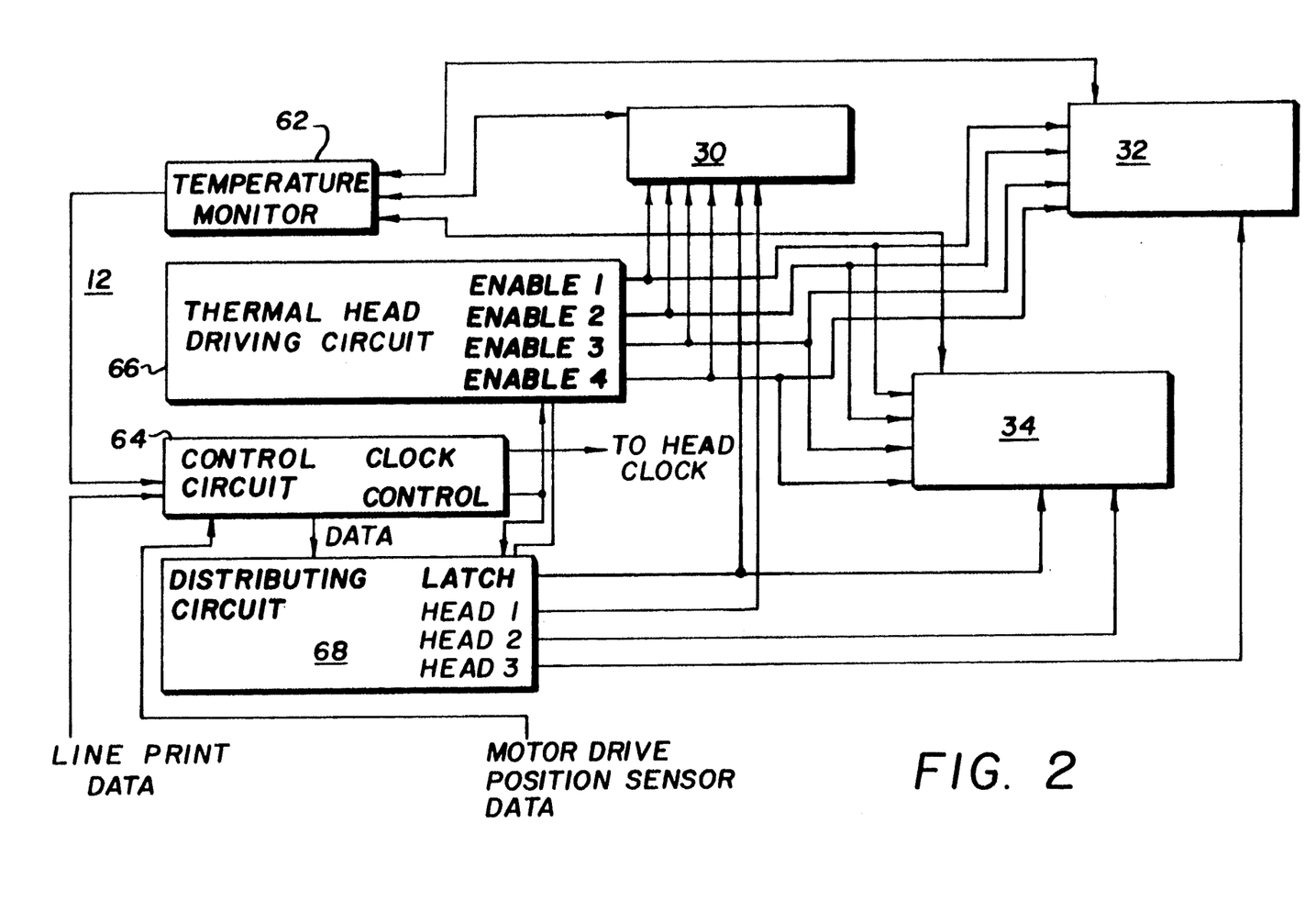
FIG. 2 is a block diagram showing one embodiment of electronic system of the thermal printer of FIG. 1 in which the invention may be practiced.
Figure 3:
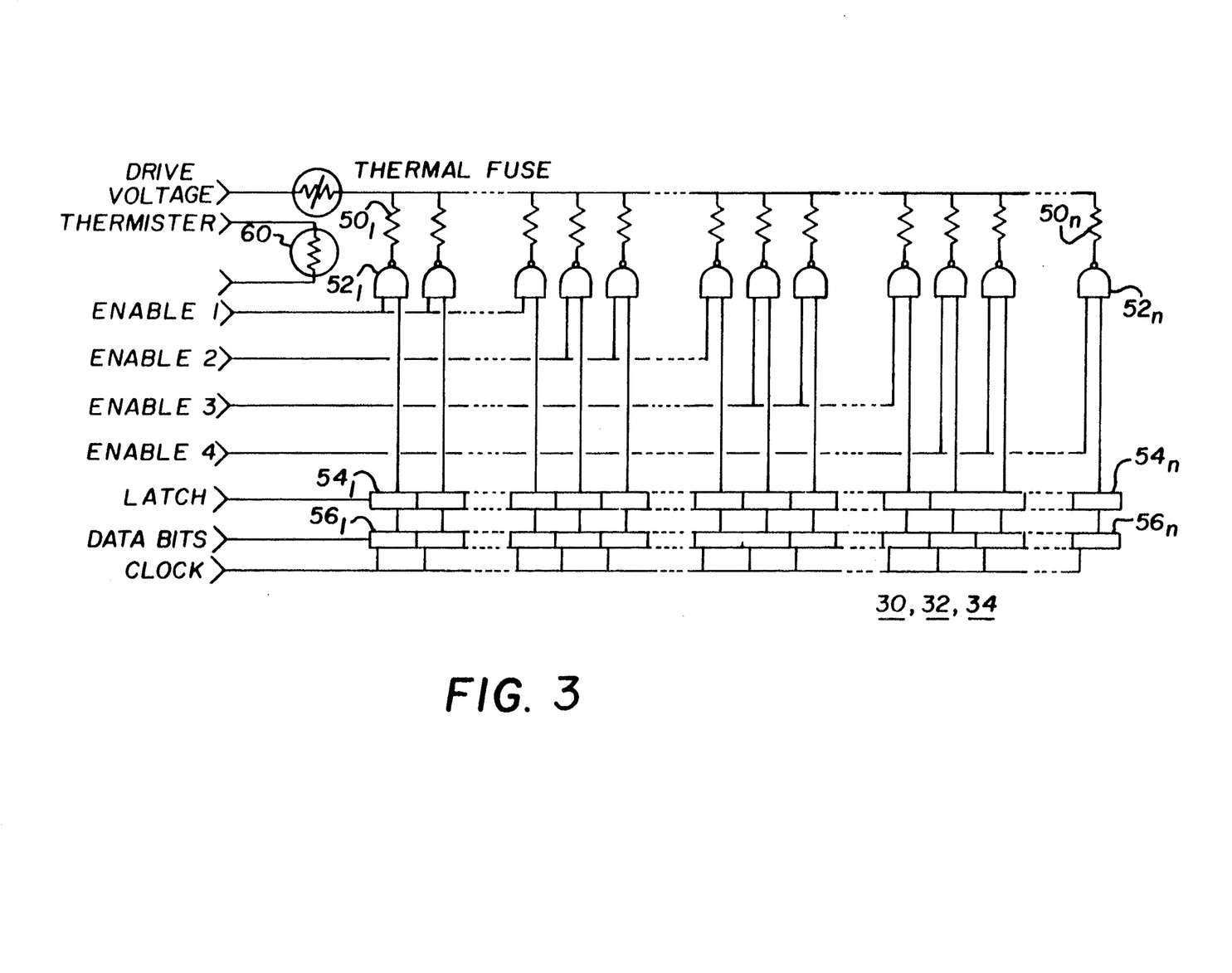
FIG. 3 is a schematic diagram of the print head elements and circuitry of the print head segments of FIG. 2.

Turning now to FIGS. 2 and 3, they depict a schematic diagram of a portion of the print enabling circuitry for generating and controlling the printing of the line print data stored in memory. The thermal print head segments 30, 32 and 34, shown schematically in FIG. 3, each comprise the n printing elements $50_1$–$50_n$, where n may be a binary number, e.g. 2048. The N sets of n thermal printing elements $50_1$–$50_n$ are connected electrically in parallel to a drive voltage source at one terminal thereof and to a NAND gate $52_1$–$52_n$. The NAND gates $52_1$–$52_n$ each have one terminal which is coupled by conductors in common to one of a number, e.g. four, terminals that separately receive a comparable number of enable signals, ENABLE1, ENABLE2, ENABLE3 and ENABLE4 in a manner known in the art.

The other terminals of the NAND gates $52_1$–$52_n$ are each separately coupled to latch stages $54_1$–$54_n$. The latch stages $54_1$–$54_n$ are coupled in common to a LATCH terminal and separately to the shift register stages $56_1$–$56_n$ so that line print data stored in the shift register stages $56_1$–$56_n$ may be loaded into the latch stages $54_1$–$54_n$ when a LATCH signal is applied thereto. The shift register stages $56_1$–$56_n$ are serially connected to a DATA input terminal and commonly connected to a CLOCK terminal so that the line print data set may be clocked into the shift register stages $56_1$–$56_n$ in a manner known in the art.

A thermistor 60 is included in each of the thermal print head segments and provides a temperature related output signal in order to monitor the segment temperature and adjust the drive voltage accordingly. In FIG. 2, the thermistor output signals are applied to the temperature monitor block 62 which provides an adjustment signal to the control circuit 64.

The interconnection of the N (three, in this embodiment) print head segments 30, 32, 34 with the printer controller 12 is depicted in FIG. 2. The line print data is received from memory in the printer controller 12 and applied to the control circuit 64 which develops the system CLOCK signal and CONTROL signals for the thermal element driving circuit 66 and the data distributing circuit 68. The CONTROL signals synchronize the distribution of the line print data sub-sets among the print head segments 30, 32, 34 and the generation, by the thermal element driving circuit 66, of the enable signals ENABLE1, ENABLE2, ENABLE3, ENABLE4 in conjunction with the advancement and sensed positions of the receiver 14 and the dye-donor webs 16, 18, 20, indicated by the position sensor data.

The distributing circuit 68 formats each line print data bit set of X data bits received at the LINE PRINT DATA input terminal into N sub-sets of line print data bits each having x data bits corresponding in number to the n thermal printing elements of each print head segment, wherein blank image pixel data bits are positionally interspersed in a complementary fashion with true image pixel data bits in data bit sub-sets corresponding to the print elements in the overlapping portions of the print head segments. The formatting is accomplished by a timing and logic system illustrated in FIG. 5 and described after the description of the illustration of its function in reference to FIGS. 4A–4D.

Turning now to FIGS. 4A–4D, they illustrate the printing of eleven successive lines of image pixels by the overlapping end regions of print head segment 30 in the first row $N_1$ and print head segment 34 in the second row $N_2$ in response to first and second line print data bit sets $X_1$ and $X_2$. The two overlapping end regions of print head segments 30 and 34 each include sub-sets of $n_1$ thermal printing elements as shown in simplified form in FIG. 4A. The non-overlapping, remaining elements number $n-n_1$ for the segments 30 and $n-2n_1$ for segment 34, since it is assumed to overlap at its other end with the other print head segment 32 in the first row $N_1$ illustrated in FIGS. 1–3. Thus, for the N illustrated segments making up the divided line thermal print head of FIGS. 1–3, there are a total of $N(n-n_1)+n_1$ thermal print elements positioned to print a like number, designated X, of line print data bits as image dots or pixels in a print line on the receiver sheet 14. In a concrete example, where $N=3$, $n=2048$ and $n_1=8$, $X=6128$ data bits and image pixels that may be printed. In FIGS. 4A–4D, however, $n_1$ is illustrated as 5 for convenience.

Referring again to FIG. 4A, the end portions of the overlapped print head segments 30 and 34 arranged in the rows $N_1$ and $N_2$ and each having, for simplicity of illustration, 5 overlapping print head elements to which 5 line image data bits will be shared are illustrated. Thus, in this example, $n_1=5$, the overlapping data bit sub-set $x_1=5$, and the masked data bit sub-sets $x_1'$ and $x_1-x_1'$ range between 1 and 4 of the five line image data bits.

Figure 4A:
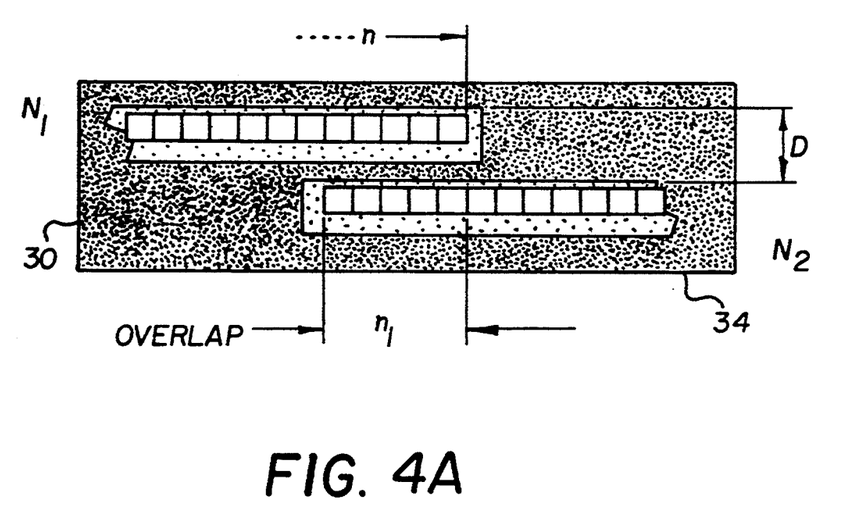
FIGS. 4A–4D are simplified schematic views illustrating the overlapping sub-segment regions of adjacent end elements of adjacent linear print head segments and the interleaving of pixels on the print media printed by the selective energization of first and second complementary sets of thermal elements to print each data line in the FIG. 1 embodiment.
Figure 4B:
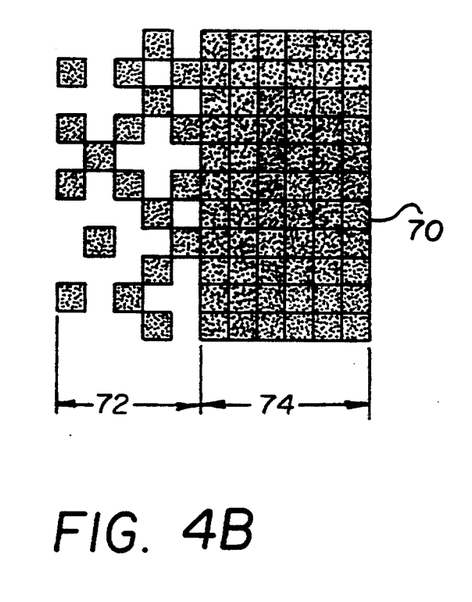
Figure 4C:
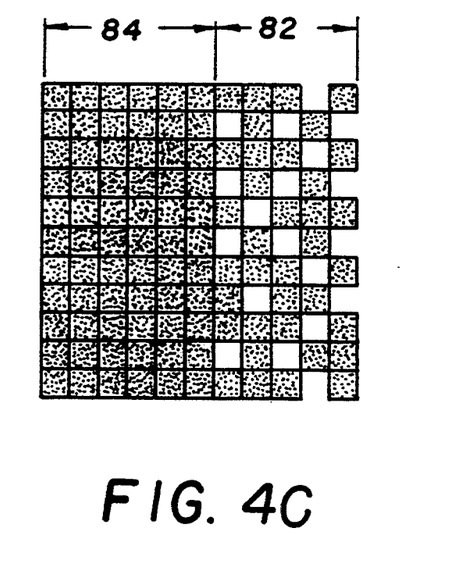

The resulting interleaved fields 70 and 80 of image pixels printed by the respective print head segments in response to the masked data bit sub-sets are illustrated in FIGS. 4B and 4C. The fields 70 and 80 are depicted merged together in FIG. 4D.

In reference to FIGS. 4B and 4C, two-dimensional fields 70 and 80 illustrate a succession of line sub-images of line image pixels separately printed by each print head segment under the control of a line print data bit or a blank bit. Each of fields 70 and 80 is shown symbolically, for purposes of illustration, with a print line segment of only eleven pixels. Each square bounded by the vertical and horizontal lines corresponds to a printed or blank image pixel effected by an energized or non-energized thermal element driven by a corresponding data bit or blank bit.

Shaded squares of each of the fields 70 and 80 symbolically represent line image pixels in the positions corresponding to thermal elements to which the distributing circuit 68 has assigned an image data bit, regardless of the density or color of the image pixel that would actually result on printing. Unshaded or blank squares in the over lap segments 72 and 82 represent such positions where the image data bit is blanked or made "zero". The distributing circuit 68 selects, at random, the distribution of the image and blank data bits, as long as the random distribution differs from that of the last line printed. A pattern generator may be employed which provides what appears to the eye to be a random distribution. In this fashion, image data is placed into all overlapping data bit locations in field 80 that correspond to blank bit locations of the field 70 and vice versa.

Field 70 also illustrates a non-overlap or complete image pixel field segment 74 in addition to the overlap image pixel field segment 72. Field 80 similarly illustrates the overlap image pixel field segment 82 and a non-overlap image pixel field segment 84. The segments 72 and 82 overlap by the five overlapping print head elements.

Figure 5A:
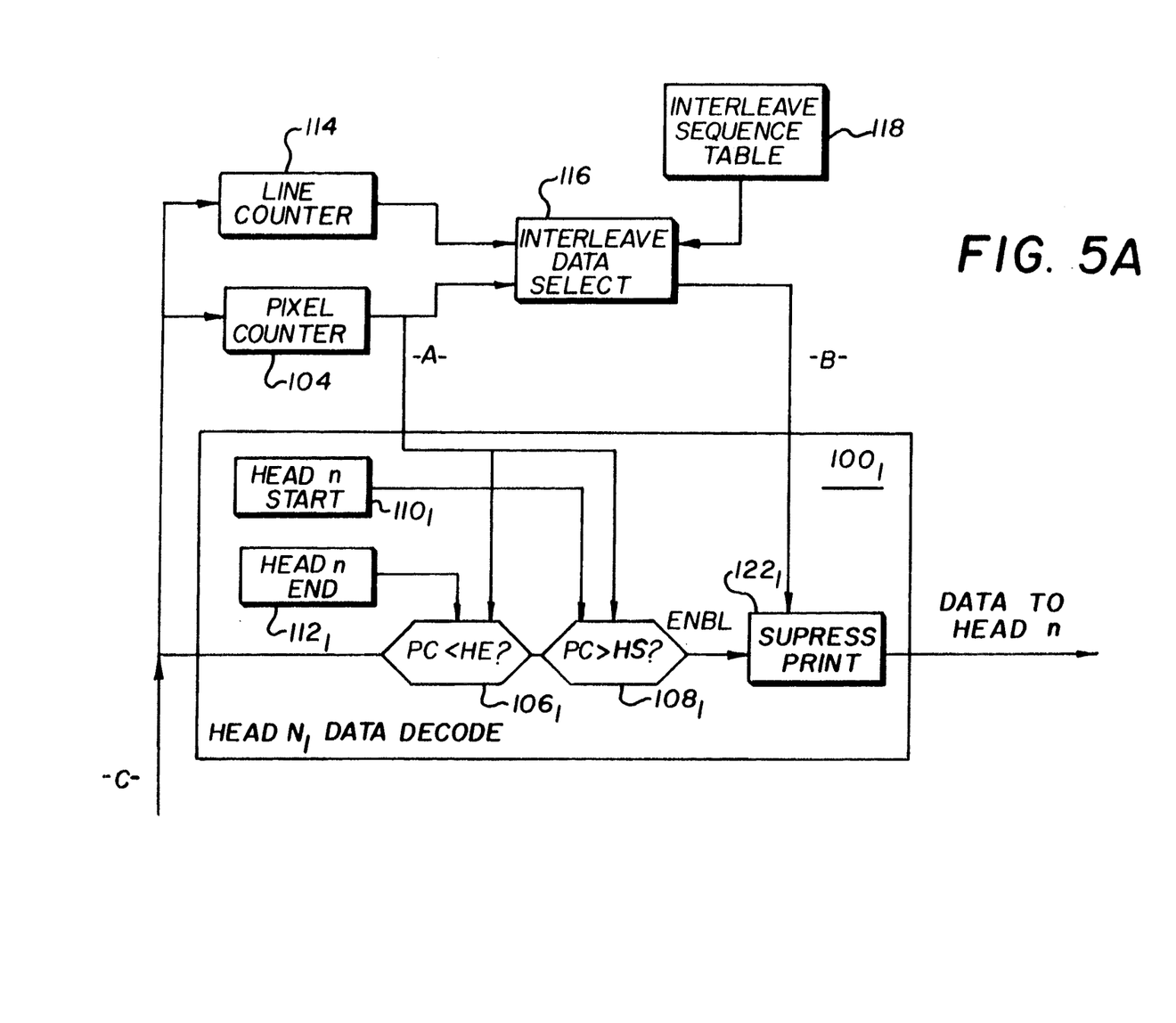
Figure 5B:
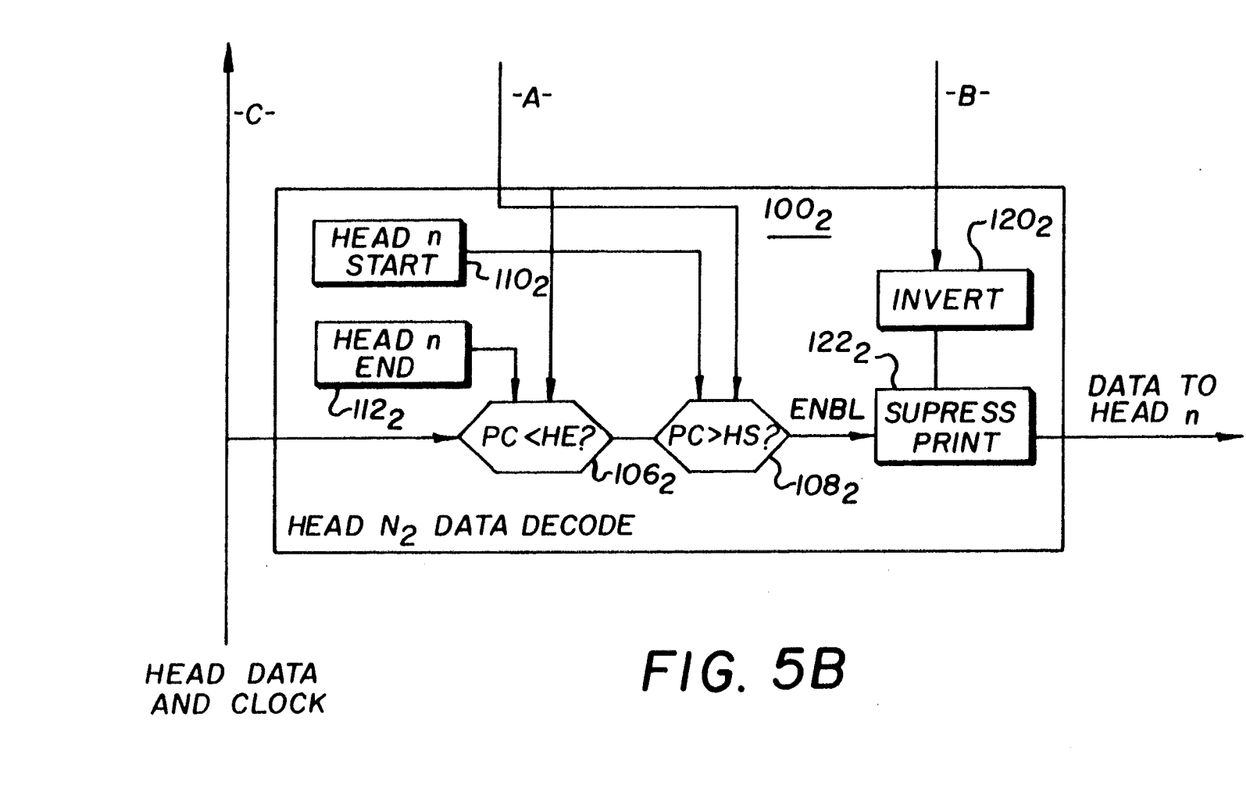

The illustrated field patterns are effected by the operating system of the distributing circuit 68 of printer controller 12 illustrated in FIG. 5. The system of FIG. 5 divides each line print data set of X data bits into N separate blocks of data bit sub-sets $X_1, X_2, \ldots X_N$ that are sequentially directed to the N print head segments. Each line print data set received on the HEAD DATA AND CLOCK line is directed to the HEAD $N_1$ DATA DECODE block $100_1$ i, the HEAD $N_2$ DATA DECODE block $100_2$ and the further decode blocks (not shown) for the N thermal print head segments. A logic network within each data decode block $100_2, 100_2$, etc., separates and transforms the line data bit stream of X data bits into the data bit sub-sets $X_1, X_2, \ldots X_N$ appearing at the output terminals thereof.

Although not specifically shown, it will be understood that the even numbered data bit sub-sets, e.g. $X_2$, are directed to line storage buffers for temporary storage so that the printing of the line segment may be synchronized to the movement of the receiver 14 from the first row $N_1$ position to the second row $N_2$, position of FIG. 1.

A PIXEL COUNTER block 104 counts the X data bits of each data line, and the count is applied to the first and second comparator and logic networks $106_1, 106_2$ and $108_1, 108_2$, labeled PC<HE and PC>HS respectively, of each data decode block $100_N$ which divides the data bit stream of X data bits into the N separate blocks of data bit sub-sets $X_1, X_2, \ldots X_N$. The comparator and logic networks 106 and 108 also receive HEAD $N_N$ START and HEAD $N_N$ END pixel count values from blocks 110 and 112 in each of the data decode blocks $100_N$ which denote the pixel counts of the first and last data bits of the N separate blocks of data bit sub-sets $X_1, X_2, \ldots X_N$ that can be printed by the respective N print head segments. The start count of each block $110_2$–$110_N$ will be less than the end count of the preceding block $112_1$–$112_{N-1}$ by the number of overlap data bits.

A line counter 114 detects the starting bit and counts each successive line of X print data bits to provide an increment signal to the INTERLEAVE DATA SELECT block 116 which responds by retrieving a new interleave pattern from the INTERLEAVE SEQUENCE TABLE memory 118. The INTERLEAVE SEQUENCE TABLE 118 stores a series of interleave patterns for a corresponding series of successively printed lines, e.g. 8 lines. Each interleave pattern is a set of binary numbers for each data bit position of the overlapping sub-sets of $x_1$ data bits (e.g. 8 pixels), and successive patterns do not repeat from print line to print line.

The retrieved interleave pattern is applied directly or through an INVERTER block 120 to the SUPPRESS PRINT? blocks $122_1$-$122_N$. The interleave pattern binary value for each data bit position provides either a "pass" or a "block" signal which is inverted by block 120. Each block 122 responds to a block signal by blocking passage of or substituting a zero output value data bit for a "true" data bit value present at its input ENBL and responds to a pass signal by passing the true data bit value on. The retrieved interleave pattern is only applied to blocks $122_1$-$122_N$ in synchrony with the application of the overlapping sub-sets of $x_1$ data bits thereto. Therefore, the non-overlap data bit sub-sets are passed through all of the blocks $122_1$-$122_N$.

In the three print head segment example described above, the INTERLEAVE DATA SELECT block 116 may be activated by pixel counts of 2040-2048 and 4080-4088 for a printer having 3 print head segments of 2048 print head elements and an overlap of 8 elements. The start and end counts of the three print head segments stored by blocks $110_{1-3}$ and $112_{1-3}$ would be 0 and 2048, 2040 and 4088, and 4080 and 6028, respectively. Therefore, the retrieved interleave pattern would be applied twice in each print line to the three SUPPRESS PRINT? blocks while the overlap data bit sub-sets are applied to the ENBL inputs thereof.

In the course of printing, the motor drive mechanisms depicted in FIG. 1 are operated to advance the receiver media 14 and the dye-donor transfer webs 36, 38, 40 past the first and second rows $N_1$ and $N_2$ of the N print head segments. The line print data bit sub-sets $X_N$ are transferred on the DATA line to the respective DATA input terminals of the first and second rows of print head segments in synchrony with the advancement of the receiver 14 so as to allow the printing of the even numbered line print data bit sub-sets, e.g. $X_2$, with the respective odd numbered line print data bit sub-sets, e.g. $X_1$ and $X_3$, in a single image line on the receiver 14.

During the printing of successive lines, the above steps are repeated with successive interleave patterns retrieved for each line of print data. In this fashion, linear print anomalies are decreased such that lines and streaks are not perceived by the unaided eye.

Figure 6A:
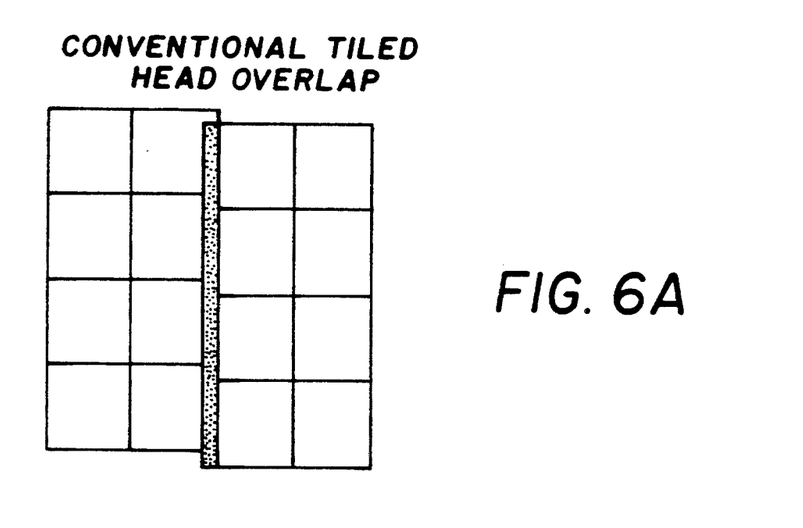
FIGS. 6A and 6B are schematic views of the linear image pixel print overlap lines generated by the prior art system and the distributed, blended print overlap lines generated by the inventive system.
Figure 6B:
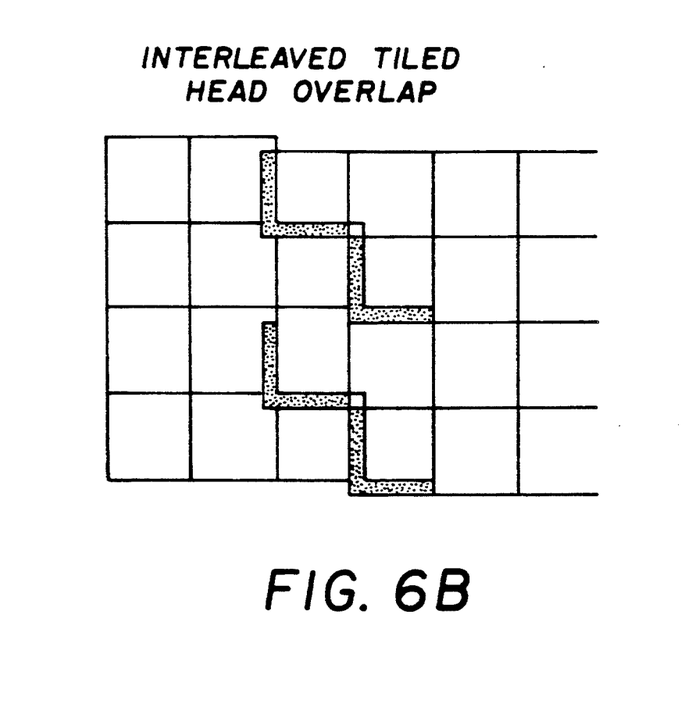

FIGS. 6A and 6B are schematic views of the linear image pixel print overlap lines generated by the prior art system and the distributed, blended print overlap lines generated by the inventive system as described above. In the divided line print head described, the maximum shift in relative overlap between adjacent thermal print head segments is half of a dot pitch as long as the line print data bit set is divided so that adjacent thermal elements in the overlapping region are selected. It can happen, however, through thermal expansion and contraction of the print head segments, that the overlap of energized adjacent thermal elements of each print head segment shifts to increase the overlap or open a gap which creates a dark line or a blur in the vertical direction and is very conspicuous. FIG. 6A illustrates a minor but noticeable line due to overlap of less than half of a dot pitch.

Figure 4D:
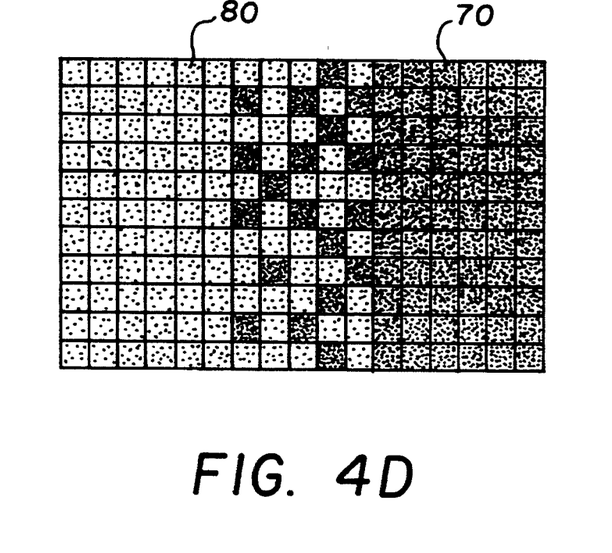

Thus in conventional divided line print heads, the error consists of a continuous straight line that occurs at the transition area from one segment to another as shown in FIG. 6A. The human eye resolution of the error is finer than the size of the pixel. The misalignment of the segments is noticeable not in the width of the discontinuity, but in its (lower frequency) length. When the mis-registration is blended in the width direction by interleaved distribution of the line print data bits in the overlapping region, the misalignment is blended into the sub-visual frequency of the elements as shown in FIGS. 4D and 6B.

In FIG. 6B, if the shift corresponds to a gap in which pixels are formed, it cannot be discriminated by eye. According to the first embodiment, since the overlap recording region corresponds to the two pixels, no gaps occur between the thermal heads. A printed image of high quality can thus be obtained. Further, the thermal heads are arranged so that the number of overlapped pixels is larger than that of overlap-recorded pixels, and the number of pixels suitable for the overlap recording is determined by defining a range of the pixels to be used. Therefore, the thermal head segments can be easily positioned.

The present invention can be applied to other forms of printing than thermal transfer recording apparatus using thermal fusion ink, thermal sublimation ink or the like.

It is to be appreciated and understood that the specific embodiments of the present invention are merely illustrative of the general principles of the invention. The invention will be understood to encompass variations and modifications thereof and equivalents thereto within the spirit and scope of the invention defined by the appended claims.

| PARTS LIST |
| --- |
| divided line thermal printer 10 |
| electronic printer controller 12 |
| receiver 14 |
| dye-donor webs 16, 18, 20 |
| drive motor 22 |
| platen and capstan drive mechanism 24 |
| drive motor 26 |
| platen 28 |
| print head segments 30, 32 and 34 |
| capstan and roller assemblies 42, 44 and 46 |
| thermal printing elements $50_1$-$50_n$ |
| NAND gate $52_1$-$52_n$ |
| latch stages $54_1$-$54_n$ |
| shift register stages $56_1$-$56_n$ |
| thermistor 60 |
| temperature monitor block 62 |
| control circuit 64 |
| thermal element driving circuit 66 |
| data distributing circuit 68 |
| field 70 |
| overlap image pixel field segment 72 |
| non-overlap or complete image pixel field segment 74 |
| field 80 |
| overlap image pixel field segment 82 |
| non-overlap image pixel field segment 84 |
| HEAD $N_1$ DATA DECODE block $100_1$ |
| HEAD $N_2$ DATA DECODE block $100_2$ |
| data decode blocks $100_N$ |
| PIXEL COUNTER block 104 |
| first comparator and logic network $106_N$ |
| second comparator and logic network $108_N$ |
| HEAD $N_N$ START pixel count value blocks $110_2$-$110_N$ |
| HEAD $N_N$ END pixel count value blocks $112_1$-$112_{N-1}$ |
| LINE COUNTER block 114 |
| INTERLEAVE DATA SELECT block 116 |
| INTERLEAVE SEQUENCE TABLE memory 118 |
| INVERTER block $120_{N-1}$ |
| SUPPRESS PRINT? blocks $122_1$-$122_N$ |
| n thermal printing elements |
| first row of $N_1$ print head segments |
| second row of $N_2$ print head segments |
| 1N sets of n thermal printing elements $50_1$-$50_n$ |

-continued

PARTS LIST

N line print data bit sub-sets
N − 1 overlapping end regions
$n_1$ overlapping thermal printing elements
$n-n_1$ non-overlapping thermal printing elements
$n-2n_1$ non-overlapping thermal printing elements for segment 34
N thermal print head segments
$N(n-n_1) + n_1$ thermal print elements
sub-sets of $x_1$ data bits in N − 1 overlapped regions
first and second complementary pattern sub-sets of $x_1'$ and
$x_1-x_1'$ data bits
X line print data bits, where $X = N(n-n_1) + n_1$
first and second line print data bit sets $X_1$, $X_2$, where
$X_1 = N_1n$ and $X_2 = N_2n$   data bits
first and second line print data bit sub-sets $X_1'$ and $X_2'$

What is claimed is:

1. A line-type printer for printing image pixels corresponding to print line data bits in an image line in a print line direction on a receiver comprising:

a plurality of print head segments arrayed in first and second rows in the print line direction, each of said print head segments further comprising a plurality of printing elements responsive to the print line data bits applied thereto for printing the image pixels to form an image line on the receiver and responsive to sequentially applied print line data bit sets for printing successive image lines on the receiver;

means for positioning the first and second rows of said print head segments so that a first overlap sub-set of a number of the printing elements of each of said print head segments in the first row spatially overlaps with a second overlap sub-set of a like number of the printing elements of each adjacent print head segment in the second row, if any, thereby defining overlapping printing elements in an overlap region;

moving means for moving the receiver relative to the first row and the second row of said print head segments in printing each image line; and printing data control means for distributing the print line data bits among the plurality of print head segments so that print line data bits are distributed in a complementary blended pattern among said overlapping printing elements of said plurality of print head segments in said first and second rows.

2. The printer of claim 1 wherein said printing data control means further comprises:

first means for distributing a first row sub-set of said print line data bits among all of the print head segments in the first row to print a first line sub-image with at least one complete and at least one partially complete first line sub-image segment of image pixels in the overlap region, said at least one partially complete first line sub-image segment having image pixels distributed in a first interleave pattern in the overlap region; and second means for distributing a second row sub-set of said print line data bits among all print head segments in the second row to print a second line sub-image with at least one complete and at least one partially complete second line sub-image segment of image pixels in the overlap region, said at least one partially complete segment of the second line sub-image having image pixels distributed in a second interleave pattern in the overlap region that is complementary to the first interleave pattern of image pixels, so that the first and second line sub-images combine to produce a complete line image for each set of print line data bits.

3. The printer of claim 2, wherein said printing data control means further comprises:

means for temporarily storing said second row sub-set of said print line data bits distributed by said second distributing means to be transferred to said printing elements of the print head segments in the second row; and enabling means synchronized with said moving means for enabling the printing elements to print said second row sub-set of said print line data bits temporarily stored in said temporary storing means so as to control the printing of complete single line images using said first and second row sub-sets of said print line data bits.

4. The printer of claim 1, wherein said printing data control means further comprises:

means for counting the number of data bits in each of said print line data bit sets;

means for defining starting and ending data bit counts for each of said print head segments in the first and second rows, where the starting count for each of said print head segments is lower than the ending count of an immediately adjacent print head segment in the overlap regions thereof;

means responsive to the starting and ending data bit counts for each print head segment for enabling the distribution of the first and second row sub-sets of said print line data bits to the respective print head segments, whereby the same print line data bits are enabled for distribution to the overlap sub-sets of printing head elements in each overlap region thereof; and means for selectively suppressing the distribution of the same print line data bits to corresponding printing elements in the overlap regions in a distributed pattern in the first and second overlap sub-sets of overlapping printing elements of each print head segment, whereby each print line data bit is distributed to only one printing element of said overlapping printing elements.

5. The printer of claim 4 wherein said printing data control means further comprises:

means for changing the distributed pattern for each sequentially applied print line data bit set such that successive complementary sub-sets of said print line data bits are printed by the first and second overlap sub-sets of overlapping printing elements to produce complete line images without discernible repeating patterns.

6. The printer of claim 1, wherein said printing data control means further comprises:

means for distributing each sequentially applied print line data bit set as successive first and second row sub-sets of print line data bits among the first and second overlap sub-sets of overlapping printing elements of each print head segment in a random pattern such that successive complementary row sub-sets of print line data bit sets printed by the first and second overlap sub-sets of overlapping printing elements produce complete line images without discernible repeating patterns in the overlap region.

7. The printer of claim 2 for printing an image by successively printing the image lines onto the receiver by thermal transfer of dye from a dye-donor media, wherein:

said print head segments further comprise linear thermal print head segments arranged in said first and second rows and each comprising a set of thermal printing elements which, when energized by a print line data bit, effect the thermal transfer of a dye from the dye-donor transfer media onto the receiver as a localized image pixel; and said moving means comprises first means for moving the receiver relative to the first and second rows of linear thermal print head segments; and further comprising:

second means for moving dye-donor transfer media relative to said first and second rows of linear thermal print head segments and the receiver;

means for temporarily storing distributed second row sub-sets of said print line data bits to be transferred to said printing elements of the thermal print head segments in the second row; and enabling means synchronized with said first and second moving means for enabling the printing elements of the second row of thermal print head segments to print image pixels from said distributed second row sub:sets of said print line data bits temporarily stored in said temporary storing means so as to control the printing of complete line images with the first and second row sub-sets of said print line data bits.

8. The printer of claim 7, wherein said printing data control means further comprises:

means for counting the number of data bits in each of said print line data bit sets;

means for defining starting and ending data bit counts for each of said thermal print head segments in the first and second rows, where the starting count for each of said print head segments is lower than the ending count of an immediately adjacent print head segment in the overlap regions thereof;

means responsive to the starting and ending data bit counts for each thermal print head segment for enabling the distribution of the first and second row sub-sets of said print line data bits to the respective thermal print head segments, whereby the same print line data bits are enabled for distribution to the overlap sub-sets of thermal printing head elements in each overlap region thereof; and means for selectively disabling the distribution of the same print line data bits to corresponding thermal printing elements in the overlap regions in a distributed pattern throughout the first and second overlap sub-sets of overlapping thermal printing elements of each thermal print head segment, whereby each print line data bit is distributed to only one thermal printing element of said overlapping thermal printing elements.

9. The printer of claim 8 wherein said printing data control means further comprises:

means for changing the distributed pattern for each sequentially applied print line data bit set such that successive complementary sub-sets of said print line data bits are printed by the sub-sets of overlapping thermal printing elements to produce complete line images without discernible repeating patterns.

10. The printer of claim 8, wherein said printing data control means further comprises:

means for distributing each sequentially applied print line data bit set as successive first and second row sub-sets of print line data bits among the first and second overlap sub-sets of overlapping thermal printing elements of each thermal print head segment in a random pattern such that successive complementary row sub-sets of print line data bit sets printed by the first and second overlap sub-sets of overlapping thermal printing elements produce complete line images without discernible repeating patterns in the overlap region due to continuously energized thermal printing elements of one or the other of the linear thermal print head segments.

11. The apparatus of claim 1 further comprising:

means for distributing the prim line data bits of each print line data bit set among the printing elements of the plurality of print head segments so that a print line data bit is applied to each priming element and identical overlap sub-sets of each print line data bit set are distributed to the first and second overlap sub-sets of printing elements in each overlap region;

means for generating first and second complementary interleave patterns of suppress data bits corresponding in number and spatial position to the first and second overlap sub-sets of printing elements in each overlap region;

means for suppressing the printing of image pixels by the first overlap sub-set of printing elements in response to the first interleave pattern thereby forming a first partially complete image line of image pixels distributed throughout the overlap region in a first pattern; and means for suppressing the printing of image pixels by the second overlap sub-set of printing elements in response to the second interleave pattern thereby forming a second partially complete image line of image pixels distributed throughout the overlap region in a second pattern that is complementary to the first pattern, so that the first and second partially complete image lines combine to produce a single complete image line in each overlap region.

12. The printer of claim 11, wherein said generating means further comprises:

means for altering the interleave pattern of the suppress data bits each time the first and second complementary interleave patterns are generated so that the interleave pattern is not repeated for successive image lines of image pixels.

13. A method of operating a line-type printer having a plurality of print head segments arrayed in first and second rows in a print line direction, each print head segment further comprising a plurality of printing elements responsive to print line data bits applied thereto for printing image pixels in an image line on a receiver and responsive to sequentially applied print line data bit sets for printing successive image lines on the receiver, wherein the first and second rows of print head segments are positioned so that a first overlap sub-set of a number of the printing elements of each print head segment in the first row spatially overlaps with a second overlap sub-set of a like number of the printing elements of each adjacent print head segment in the second row, if any, thereby defining an overlap region, and wherein the receiver is moved relative to the first row and the second row of print head segments in printing each image line, the method comprising the steps of:

distributing a first sub-set of print line data bits among all print head segments in the first row to enable printing of a first line sub-image, the first line sub-image formed of complete line sub-image segments of image pixels between overlap regions and partially complete line sub,image segments of image pixels in each overlap region, each partially complete line sub-image segment having its image pixels distributed in a first interleave pattern in the overlap region;

distributing a second sub-set of print line data bits among all print head segments in the second row to enable printing of a second line sub-image, the first line sub-image formed of complete line sub-image segments of image pixels between overlap regions and partially complete line sub-image segments of image pixels in each overlap region, each partially complete line sub-image segment having its image pixels distributed in a second interleave pattern in the overlap region that is complementary to the first interleave pattern of image pixels, so that the first and second line sub-images combine to produce a complete line image for each set of line image data bits when printed by the first and second rows of print head segments.

14. The method of claim 13 wherein the first and second distributing steps further comprise the steps of:

distributing the print line data bits of each print line data bit set among the printing elements of the plurality of print head segments so that a print line data bit is applied to each printing element and identical overlap sub-sets of each print line data bit set are distributed to the first and second overlap sub-sets of printing elements in each overlap region;

generating first and second complementary interleave patterns of suppress data bits corresponding in number and spatial position to the first and second overlap sub-sets of printing elements in each overlap region;

suppressing the distribution of data bits to the first overlap sub-set of printing elements in response to the first interleave pattern, thereby forming a first partially complete print line data bit overlap sub-set distributed throughout the overlap region in a second pattern complementary to the first interleave pattern; and suppressing the distribution of data bits to the second overlap sub-set of printing elements in response to the second interleave pattern, thereby forming a second partially complete print line data bit overlap sub-set distributed throughout the overlap region in the first pattern complementary to the second interleave pattern, so that the first and second partially complete print line data bit sub-sets combine to produce a single complete print line data bit set in each overlap region.

15. The method of claim 14 wherein the generating step further comprises:

altering the interleave pattern of the suppress data bits each time the first and second complementary interleave patterns are generated so that the interleave pattern is not repeated for successive image lines of image pixels.

16. The method of claim 14 wherein the generating step further comprises:

distributing the interleave pattern of the suppress data bits throughout the overlap segment in a random pattern.

17. The method of claim 13 wherein the generating step further comprises:

altering the interleave pattern of the suppress data bits each time the first and second complementary interleave patterns are generated so that the interleave pattern is not repeated for successive image lines of image pixels.

18. The method of claim 13 wherein the generating step further comprises:

distributing the interleave pattern of the suppress data bits throughout the overlap segment in a random pattern.

19. A method for thermally recording image data on a wide receiver media employing a print head arrangement of the type comprising a plurality N of linear print head segments each comprising a set n of printing elements extending between ends thereof, each of said printing elements having a data bit input terminal and adapted to be energized by a print data bit to effect the recording of an image pixel in a line on the receiver media, said N linear print head segments arranged in an alternating, staggered pattern in first and second rows of $N_1$ and $N_2$ print head segments extending across the media in a print line direction such that respective sub-sets of $n_1$ printing elements of adjacent ends of the $N_1$ and $N_2$ print head segments arranged in the first and second rows overlap in an overlap region or regions in the print line direction, the method comprising the steps of:

printing a first line sub-image employing the first row of $N_1$ print head segments, the first line sub-image having first blank image pixels for the overlapping sub-sets of $n_1$ thermal print elements which are distributed in the overlap region in accordance with a first blank data bit pattern that does not produce a substantial linear alignment of resulting blank image pixels of successive line sub-images with one another;

advancing the receiver media to the second row of $N_2$ print head segments and into a printing position aligned with respect to the first line sub-image;

printing a second line sub-image in alignment with the first line sub-image employing the second row of $N_2$ print head segments, the second line sub-image having second blank image pixels for the overlapping sub-sets of $n_1$ thermal print elements which are distributed in a complementary second blank data bit pattern with respect to the first blank image pixels of the first line sub-image; and repeating the printing steps to print each complete line image while changing the complementary patterns of said first and second blank data bits for each successive image line formed of first and second line sub-images.

20. The method of claim 19, wherein $n_1$ is equal to 2 to 8 overlapping printing elements.

21. The method of claim 19 wherein the printing steps are preceded by the steps of:

processing each print line data bit set comprising X data bits, where $X=N(n-n_1)+n_1$, into first and second line print data bit sets $X_1$, $X_2$, where $X_1=N_1n$ and $X_2=N_2n$ respective data bits for application to the data input terminals of the printing elements in the first and second rows of $N_1$, $N_2$ print head segments, each of said print line data bit sets including $N-1$ sub-sets of $x_1$ overlapping, identical in number, data bits corresponding in number and position to the $n_1$ overlapping printing elements in each overlap region, the processing step further comprising the steps of:

for each of the $N-1$ sub-sets of $x_1$ overlapping data bits in the first line print data bit set $X_1$, masking a further sub-set of $x_1'$ data bits in a pattern interleaved in position among the $x_1$ data bits; and for each of the $N-1$ sub-sets of $x_1$ overlapping data bits in the second line print data bit set $X_2$, masking the complementary further sub-set of $x_1-x_1'$ data bits in a complementary pattern to the pattern of the $x_1'$ masked data bits of the first line print data bit set $X_1$;

applying the first and second print line data bit sets $X_1'$ and $X_2'$ to the data input terminals of the first and second rows of $N_1$ and $N_2$ print head segments; and wherein the printing steps further comprise:

energizing the first and second rows of $N_1$ and $N_2$ print head segments in synchrony with advancement of the receiver to print the first and second complementary line print data bit sets $X_1'$ and $X_2'$ in a single image line of the media; and wherein the repeating step further comprises:

repeating the above steps with respect to each print line data bit set of $X$ data bits, and for each such line, altering the masking pattern of the masked data bit sub-sets $x_1'$ and $x_1-x_1'$.

* * * * *

UNITED STATES PATENT AND TRADEMARK OFFICE
CERTIFICATE OF CORRECTION

PATENT NO. : 5,450,099
DATED : September 12, 1995
INVENTOR(S) : Stanley W. Stephenson et al It is certified that error appears in the above-indentified patent and that said Letters Patent is hereby corrected as shown below:

In Column 16, claim 11, line 17, change "prim" to --print--.

In Column 16, claim 11, line 20, change "priming" to --printing--.

Signed and Sealed this

Twentieth Day of February, 1996

Attest:

BRUCE LEHMAN

Attesting Officer

Commissioner of Patents and Trademarks